United States Patent [19]

Godesa

[11] Patent Number: 5,735,611
[45] Date of Patent: Apr. 7, 1998

[54] BEARING ARRANGEMENT FOR AN OPERATING SHAFT

[75] Inventor: Ludvik Godesa, Berlin, Germany

[73] Assignee: Siemens Aktiengesellschaft, Munich, Germany

[21] Appl. No.: 722,179

[22] PCT Filed: Apr. 10, 1996

[86] PCT No.: PCT/DE95/00491

§ 371 Date: Oct. 10, 1996

§ 102(e) Date: Oct. 10, 1996

[87] PCT Pub. No.: WO95/29496

PCT Pub. Date: Nov. 2, 1995

[30] Foreign Application Priority Data

Apr. 20, 1994 [DE] Germany .................. 44 16 090.9

[51] Int. Cl.[6] .................................................. F16C 35/02
[52] U.S. Cl. .......................... 384/296; 384/435; 384/439
[58] Field of Search ........................... 384/276, 295, 384/296, 154, 416, 428, 439, 441, 435

[56] References Cited

U.S. PATENT DOCUMENTS

| | | |
|---|---|---|
| 1,919,319 | 7/1933 | Church .................................. 384/435 |
| 3,584,923 | 6/1971 | Goossens .............................. 384/296 |
| 3,600,540 | 8/1971 | Bould ................................... 200/153 |
| 3,751,122 | 8/1973 | Dubay .................................. 384/296 |
| 4,025,131 | 5/1977 | Bergquist et al. .................... 384/428 |
| 4,498,790 | 2/1985 | Fisher .............................. 384/296 X |
| 4,502,796 | 3/1985 | Wilczewski et al. ................ 384/439 |

FOREIGN PATENT DOCUMENTS 35 40 328  8/1990  Germany .

*Primary Examiner*—Thomas R. Hannon
*Attorney, Agent, or Firm*—Kenyon & Kenyon

[57] ABSTRACT

A bearing arrangement for an operating shaft of a multi-pole electric switching device with a chassis formed by central and outer walls that are parallel to each other. The bearing arrangement comprises shaft bearings in the form of half-shells. The central walls, which are designed to accommodate the shaft bearings, are each provided with an open recess at its edge. The recess has one bordering edge that corresponds to the radius and width of a groove located on the outer periphery of the half-shells and another bordering edge that corresponds to the outside diameter of the half-shells. A locking piece is attached to the respective wall and secures the half-shells after they have been assembled on the operating shaft.

6 Claims, 1 Drawing Sheet

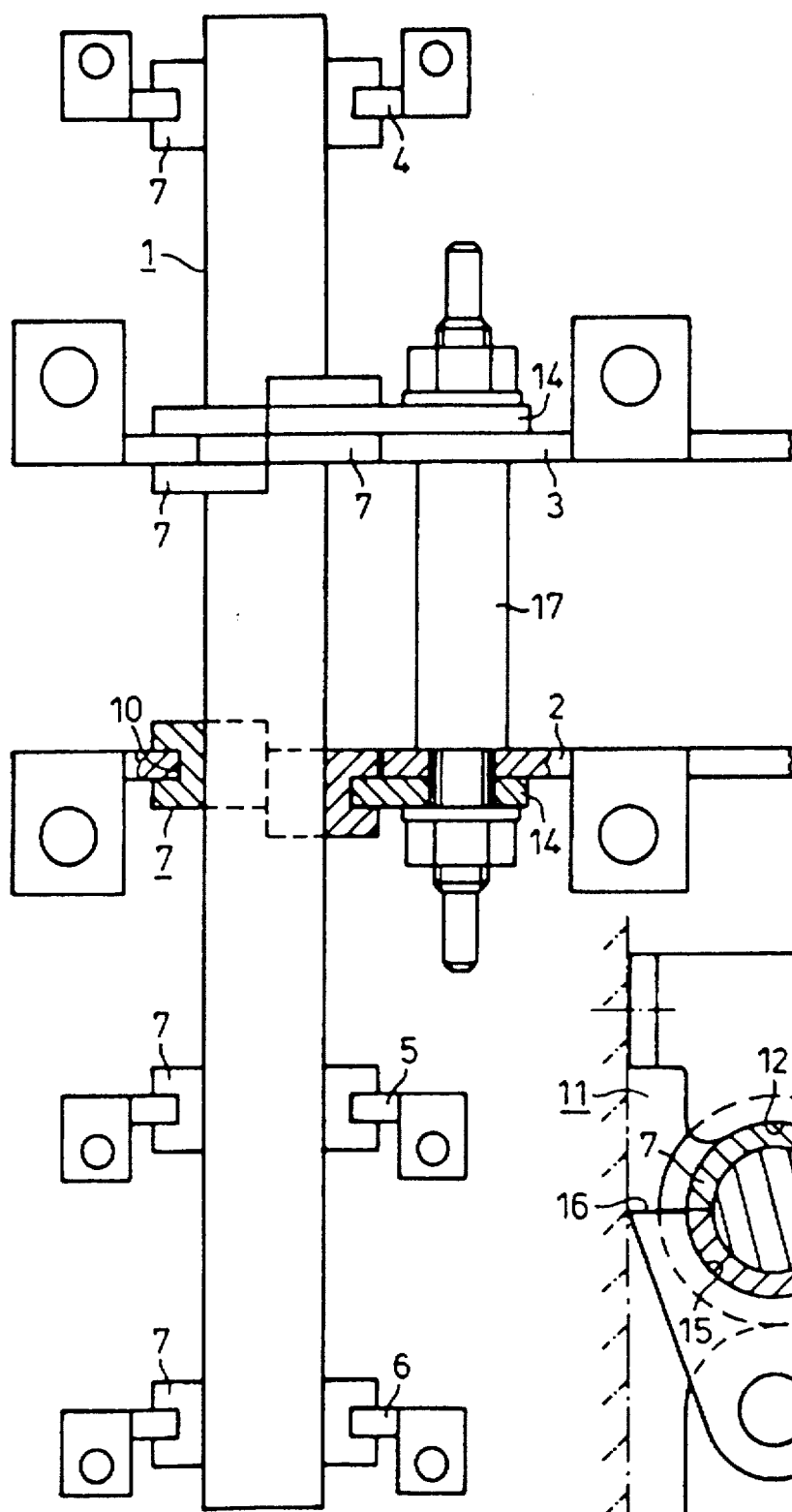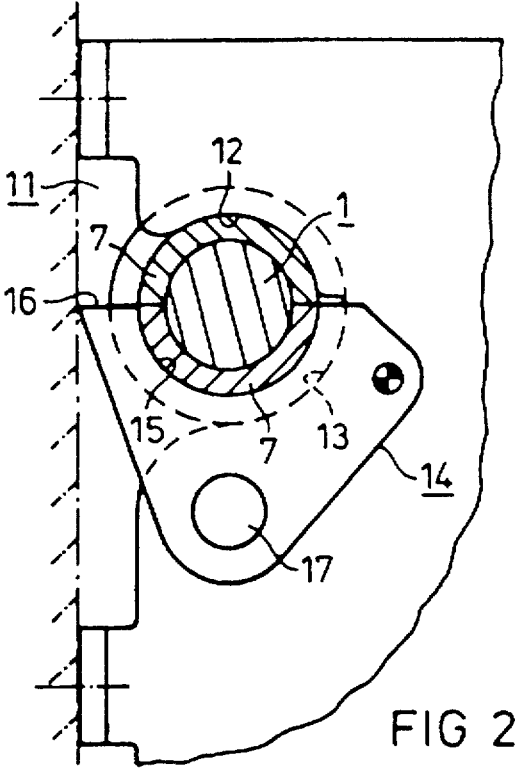
FIG 1
FIG 2

BEARING ARRANGEMENT FOR AN OPERATING SHAFT

FIELD OF THE INVENTION

The invention concerns a bearing arrangement for the operating shaft of a multi-pole electric switching device with a chassis formed from central and outer walls that are parallel to each other. Shaft bearings are provided in two outside walls and two central walls.

BACKGROUND OF THE INVENTION

A bearing arrangement of this type is disclosed, for example, in U.S. Pat. No. 3,600,540. Since a total of four shaft bearings are used, there have been problems in aligning these shaft bearings. However, it has not been possible to use a greater radial play to compensate for this alignment tolerance because that would not permit the required precision in the switching operation nor would it allow a sufficient service life for the shaft.

The object of the invention is to create a bearing arrangement that is easy to assemble and is especially suitable for the central walls.

SUMMARY OF THE INVENTION

This object is achieved according to this invention by dividing the shaft bearings into two half-shells. Each half-shell is provided with a groove on its outer periphery. In addition, the edges of each of the two central walls of the chassis are provided with an open recess. The recess has a bordering edge corresponding to the radius and width of the groove. This arrangement makes it possible to insert the completely finished operating shaft into the recess and assemble the shaft bearings. This can be done, for example, by placing one half-shell of the shaft bearing around the exposed end of the shaft and then making the groove engage the bordering edge by rotating the half-shell.

The arrangement according to the invention can be designed so that the bordering edge of the recess extends over only part of the periphery of the recess, and the remaining part of the recess has another bordering edge that corresponds to the outside diameter of the half-shell. This makes it possible to bring the periphery of a second half-shell, which is needed to form a complete shaft bearing, in contact with the expanded area of the recess by laterally displacing the second half-shell along the shaft. When completely assembled, this yields an offset by approximately the width of the above-mentioned groove. The second half-shell is secured using a suitable device in order to ultimately secure the shaft bearing. For example, this can be accomplished by designing one of the half-shells so it can be secured by a locking piece that is attached to the respective wall and has an end edge matching the groove in the half-shell; the locking piece also has at least one stop face that serves as an anti-rotation element for the half-shell not engaged by the locking piece.

This invention creates the possibility of mounting, under very tight spatial conditions, a shaft bearing with a high carrying power close to the area of the operating shaft where the main driving force is applied to the operating shaft. The same arrangement can also be provided at the ends of the operating shaft on the outside walls of the chassis. However, it has proven adequate to support the ends of the operating shaft only in the direction of the resulting counter-force such that only one half-shell need be inserted into the respective outside wall. This arrangement also makes it easier to maintain the required alignment tolerance.

BRIEF DESCRIPTION OF THE DRAWINGS

FIG. 1 shows an operating shaft for a low-voltage four-pole circuit-breaker having several shaft bearings.

FIG. 2 shows a view of a central shaft bearing with the operating shaft cut away.

DETAILED DESCRIPTION

Operating shaft 1 according to FIGS. 1 and 2 is mounted in the chassis of a low-voltage circuit-breaker having two central walls 2 and 3 as well as outside walls 4, 5 and 6. These walls are parallel to each other and are joined together by a suitable method such as cross-bars or by connecting them to other component groups of the circuit-breaker. Central walls 2 and 3 accommodate between them a drive mechanism which includes a spring energy storage device and a lever arrangement for transmitting the force of the spring energy store to the operating shaft. Since spring energy storage devices and lever arrangements of the type in question here are already known, details of how the force is applied to operating shaft 1 need not be discussed here. Likewise, lever arrangements that serve to connect the operating shaft 1 to the switch contact arrangements of the individual poles are also not discussed.

The shaft bearings of operating shaft 1 each consist of two half-shells 7, each having a groove 10 on their outer periphery. Furthermore, walls 2 and 3 are each provided with an open recess 11 at the edge to permit the insertion of operating shaft 1 as well as the subsequent mounting of half-shells 7. (FIG. 2) For this purpose, recess 11 has one bordering edge 12 with a radius corresponding to groove 10 and another bordering edge 13 with a radius corresponding to the outside circumference of half-shells 7.

To assemble the shaft bearings, the operating shaft 1 is first inserted into recess 11 from the side. Then, a half-shell 7 is placed around the shaft at the side of either wall 2 or 3. The half-shell 7 is displaced in the area of the enlarged bordering edge 13 until groove 10 is opposite the beginning of the narrower bordering edge 12. Starting from this position, half-shell 7 is rotated around the shaft in the peripheral direction until bordering edge 12 completely engages the groove 10 in the respective half-shell 7. In this condition, the enlarged bordering edge 13 of recess 11 is accessible again so that the second half-shell 7 may be brought into the area of bordering edge 13 by placing it around operating shaft 1 and displacing it laterally. A fork-like locking piece 14 having a semicircular recess 15 with a radius corresponding to groove 10 secures the second half-shell 7 in this position. End edges 16 of locking piece 14 form stop faces for half-shell 7 that is inserted first, so now the half-shells are mounted and secured against rotation. As FIG. 1 shows, the two half-shells 7 of a shaft bearing are offset by the thickness of wall 2 or 3 relative to each other. This offset has little importance for the properties of the shaft bearing, as does the presence of a gap between the half-shells, because operating shaft 1 does not execute a continuous rotational movement but instead it performs only short intermittent rotations.

As FIG. 1 also shows, locking pieces 14 are mounted on a connecting pin 17 that passes through the two walls 2 and 3. This assures a reliable support and good transmission of force. Identical shaft bearings can also be provided in the other walls 4, 5 and 6. It may be sufficient, however, to use only one half-shell 7 and arrange it so that the opposing force exerted by the respective pole of the circuit-breaker is absorbed. This facilitates assembly while making it easier to maintain the required tolerance.

The principle described here whereby the shaft bearings are arranged as close as possible to the point where the driving force is introduced can be applied regardless of the number of poles of the switching device. Therefore, the component group comprising central walls 2 and 3 can also be used with three-pole circuit-breakers, for example.

What is claimed is:

1. A bearing arrangement for an operating shaft of a multi-pole electric switching device comprising:

a chassis formed by parallel walls; and shaft bearings comprising two half-shells, each half-shell having a groove on its outer periphery, the half-shells being mounted to the parallel walls;

wherein each of at least two neighboring walls of the chassis include at an edge thereof an open recess having a bordering edge with the radius and width of the groove, wherein the bordering edge defines only part of the recess and wherein the remainder of the recess is defined by another bordering edge corresponding to the outside diameter of the half-shells.

2. The bearing arrangement according to claim 1, wherein the bearing arrangement further comprises a locking piece supporting one of the half-shells, said locking piece being mounted to one of the parallel walls and having a recess provided that matches the groove of the half-shell, wherein the locking piece has at least one stop face for the half-shell that is not supported by the locking piece.

3. The bearing arrangement according to claim 1, wherein the parallel walls include outer walls, and wherein the operating shaft comprises two ends that are each supported by a half-shell inserted into outer walls of the chassis.

4. A bearing arrangement for an operating shaft of a multi-pole electric switching device, comprising:

a chassis formed by a plurality of parallel walls arranged side by side in an axial direction of the shaft, said walls including two central walls and a plurality of outer walls; and shaft bearings for the central walls comprising two half-shells, each half-shell having a groove on its outer periphery, said half shells being mounted to the central walls;

wherein each of at least said central walls include at an edge thereof an open recess having a bordering edge with the radius and width of the groove, and wherein the bordering edge defines only part of the recess and wherein the remainder of the recess is defined by another bordering edge corresponding to the outside diameter of the half-shells.

5. The bearing arrangement according to claim 4, wherein the bearing arrangement further comprises a locking piece supporting one of the half-shells, said locking piece being mounted on one of the central walls and having a recess that matches the groove of the half-shell, wherein the locking piece has at least one stop face for the half-shell that is not supported by the locking piece.

6. The bearing arrangement according to claim 4, wherein the operating shaft comprises two ends that are each supported by a half-shell inserted into outer walls of the chassis.

* * * * *